United States Patent

[11] 3,532,040

[72] Inventors: Gabriele Ehgartner
Pullach, near Munich;
Gerd Kiper, Luedersen, near Hannover,
Germany
[21] Appl. No. 689,916
[22] Filed Dec. 12, 1967
[45] Patented Oct. 6, 1970
[73] Assignee Agfa-Gevaert Aktiengesellschaft,
Leverkusen, Germany
[32] Priority Dec. 17, 1966
[33] Germany
[31] A 54,411

[54] PHOTOGRAPHIC CAMERA
12 Claims, 4 Drawing Figs.
[52] U.S. Cl. .................................................. 95/31
[51] Int. Cl. .......................................... G03b 19/04
[50] Field of Search ........................................ 95/31,
31(ACFS), 31(FSL)

[56] References Cited
UNITED STATES PATENTS
3,148,605  9/1964  Peterson ...................... 95/31
3,232,196  2/1966  Sapp et al. .................... 95/31
3,253,526  5/1966  Steisslinger ................... 95/31
3,416,424  12/1968  Harvey ......................... 95/31
3,416,425  12/1968  Rigolini ....................... 95/31

Primary Examiner—John M. Horan
Assistant Examiner—David S. Stallard
Attorney—Michael S. Striker ABSTRACT: A still camera for use with film of the type having perforations spaced from each other by distances corresponding to those between the centers of successive film frames. A double exposure preventing member of the camera prevents depression of the shutter release prior to transport of film upon completion of an exposure, and this member also serves as a means for moving the shutter to open position upon depression of the shutter release. The film transporting mechanism is locked against further transportation of film when a fresh frame is in registry with the opening of the shutter. Such locking action is furnished by an assembly including a sensing member which is pivotable and reciprocable with reference to the housing of the camera and has a tooth which can penetrate into a perforation in response to movement of the double exposure preventing member to an idle position, and a locking lever which is articulately connected with the sensing member and engages a ratchet wheel of the film transporting mechanism when the tooth enters a perforation and upon completed transport of film by the length of a frame. A spring which operates between the housing and the locking lever urges the latter against the ratchet wheel and also tends to move the tooth of the sensing member into a perforation.

Patented Oct. 6, 1970

INVENTOR.
GABRIELE EHGARTNER
GERD KIPER
BY
Michael S. Striker.
Attorney

INVENTOR.

BY GABRIELE EHGARTNER
GERD KIPER 3,532,040

PHOTOGRAPHIC CAMERA

BACKGROUND OF THE INVENTION

The present invention relates to photographic cameras in general, and more particularly to improvements in cameras of the type wherein a sensing member tracks the film and enters a perforation in the film to thereby initiate locking of the film transporting mechanism when the film has been transported by the length of a frame.

In presently known cameras of the just outlined character, the sensing member is movable independently of a locking member which latter comes into direct engagement with the film transporting mechanism. An advantage of such cameras is that the locking member can be biased independently of the sensing member and can yield, if necessary, to prevent damage to the film transporting mechanism, particularly to a ratchet wheel of the film transporting mechanism which cooperates with the locking member to prevent further movements of the manually operated lever or wheel which constitutes the actuating means of the film transporting mechanism. However, the expenditures involved in the manufacture of parts and in assembly of the camera are high. Furthermore, the film must move the sensing member against the opposition of relatively strong springs.

It is also known to employ a locking member which forms an integral part of the sensing member. Such construction is much simpler than the previously described one but the locking part of the sensing member is more likely to damage the film transporting mechanism and/or to tear the film when a tooth of the film transporting mechanism is improperly engaged by a tooth of the locking part.

SUMMARY OF THE INVENTION

It is an object of our invention to provide a photographic camera which embodies all advantages but avoids the drawbacks of aforedescribed conventional cameras.

Another object of the invention is to provide a novel and improved connection between and a novel mounting for the film sensing and locking means in a photographic camera, particularly in a still camera.

A further object of the invention is to provide a camera wherein the member which locks the film transporting mechanism cannot damage the mechanism and wherein such member can receive motion from the double exposure preventing member of the camera.

An additional object of the invention is to provide a photographic camera wherein the double exposure preventing member can control movements of the film sensing and locking means and can also serve as a means for operating the shutter.

Still another object of the invention is to provide a photographic camera wherein a single spring suffices to bias not only the film sensing means but also the locking means which prevents further operation of the film transporting mechanism when a fresh film frame is ready to be exposed to scene light.

A concomitant object of our invention is to provide a photographic camera of the just outlined character wherein the means for sensing the film and the means for locking the film transporting mechanism occupy little room and can be readily accommodated in a space which is normally available in the housing of a camera.

The camera of our invention is particularly suited for use with film of the type having perforations spaced from each other by distances which correspond to those between the centers of successive film frames. It comprises a housing, shutter means movable in the housing to an open position and normally assuming a closed position, release means operative to effect movement of shutter means to open position, for example, through the intermediary of a control member or double exposure preventing member which prevents repeated operation of release means prior to transport of the film by the length of a frame, film transporting means supported by the housing and operative to advance the film lengthwise, sensing means movably mounted in the housing and having a sensing portion normally engaging the film to penetrate into a perforation therein, and locking means articulately connected with the sensing means to arrest the film transporting means in response to penetration of the sensing portion into a fresh perforation and upon completed transport of the film by the length of a frame. The camera preferably further comprises common biasing means for the sensing means and locking means, for example, a spring which operates between the locking means and the housing. The double exposure preventing member can disengage the locking means from the film transporting mechanism when it moves in a first direction under the action of a spring upon operation of the release means, and the film transporting means can move the double exposure preventing member back to its idle position in response to transport of the film to thereby permit re-engagement between the film transporting means and the locking means when the sensing portion enters a fresh perforation and an unexposed film frame registers with the light-admitting opening of the shutter.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENT

Figure 1:
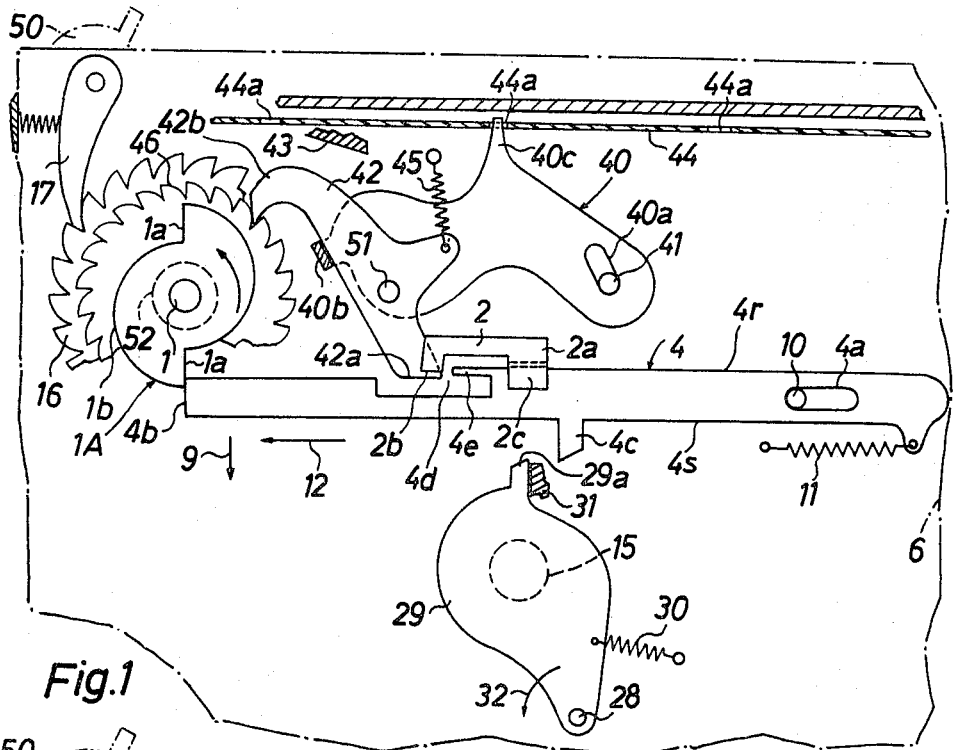
FIG. 1 is a schematic partially front elevational and partly top plan view of certain components in a still camera which embodies our invention, the locking and sensing means of the camera being shown in positions which they assume when the camera is ready to make an exposure.

The drawing illustrates certain components of a still camera which comprises a housing or casing 6 (indicated by phantom lines). The light-admitting opening 15 which is located behind the objective (not shown) is normally covered by the blade 29 of a simple shutter. The film is shown at 44. This film is stored in a supply cartridge and extends behind the opening 15, its leading end being affixed to a takeup spool (not shown). For the sake of simplicity, the shutter blade 29 is shown in the plane of FIGS. 1 to 4 even though it is actually located in a plane which is parallel to that of the film 44 and is normal to the planes of FIGS. 1 to 4. The shutter release comprises a slide 2 having a portion extending beyond the top wall of the housing 6 and being depressible by hand to move in a plane at right angles to the planes of FIGS. 1 to 4. A return spring (not shown) biases the slide 2 to its starting or upper end position in which the slide bears against a suitable stop. Reference may be had to the copending application Ser. No. 692,976, filed Dec. 22, 1967 by Günter Fauth and assigned to the same assignee. The slide 2 comprises two arms 2a, 2b, the former of which is provided with an inclined cam face 2c.

The film transporting mechanism of the camera comprises a suitable manually operated actuating wheel or lever 50 which is coupled to a shaft 1 by means of a conventional friction clutch 52. The shaft 1 is rigid with a disk-shaped cam 1A having two projections or teeth 1a provided with flanks extending radially of the shaft 1. The cam 1A cooperates with a double exposure preventing member or control member 4 which is reciprocable below the top wall of the housing 6 and resembles a flat strip. This member 4 will be called a bolt for short. It is biased by a spring 11 which tends to move it in a direction to the left, as indicated by arrow 12, and its right-hand end portion has an elongated slot 4a for a guide pin 10 affixed to the housing 6. The bolt 4 can pivot about the pin 10 and counter to the direction indicated by arrow 9.

When the user wishes to make an exposure, the slide 2 is depressed in a direction at right angles to the plane of FIG. 1 whereby its arm 2b enters a recess or notch 4d in the rear edge face 4r of the bolt 4. The recess 4d registers with the arm 2b only when a fresh film frame is located behind the opening 15, i.e., upon actuation of the lever 50. The cam face 2c on the arm 2a of the slide 2 then pivots the bolt 4 in a counterclockwise direction (arrow 9) so that the left-hand end portion 4b of the bolt moves away from the adjoining tooth 1a on the cam 1A. Thus, the film transporting mechanism is then ready to transport the film 44 by the length of a frame. As the bolt 4 pivots in the direction indicated by arrow 9, it moves the recess 4d forwardly and away from the arm 2b of the slide 2 so that the spring 11 (which is stressed) is free to contract and propels the bolt 4 in a direction to the left, as indicated by the arrow 12. Such leftward movement of the bolt 4 is possible because its end portion 4b is moved away from the tooth 1a (i.e., downwardly, as viewed in FIG. 1). The extent of leftward movement of the bolt 4 is determined by the length of its slot 4a, the left-hand end position of this bolt being shown in FIG. 3.

Figure 3:
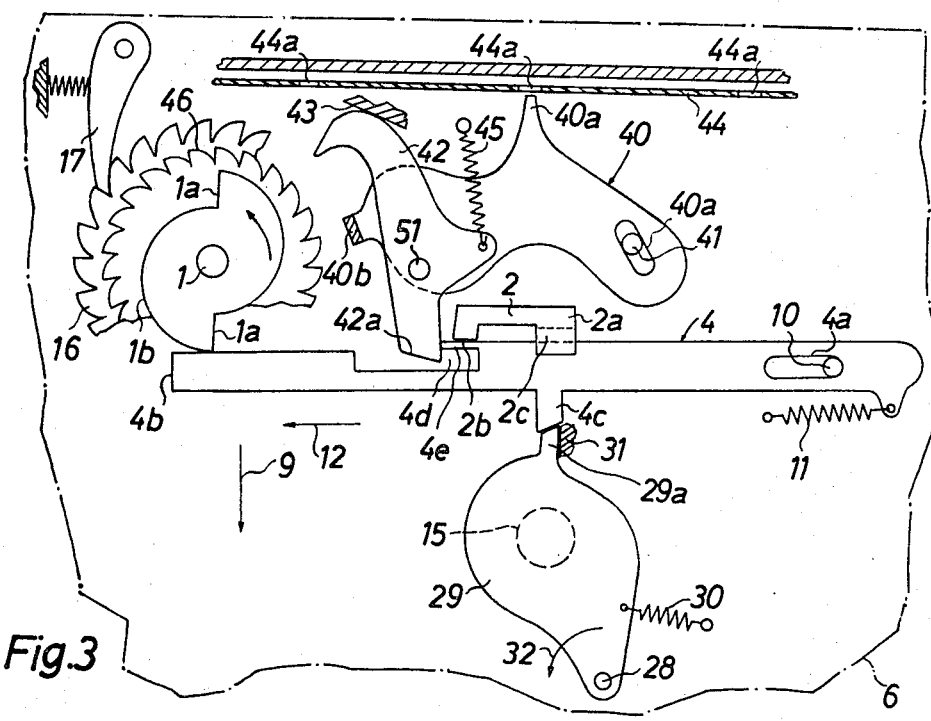
FIG. 3 illustrates the structure of FIG. 1 but with the locking and sensing means in positions which they assume when the shutter returns to closed position.
Figure 4:
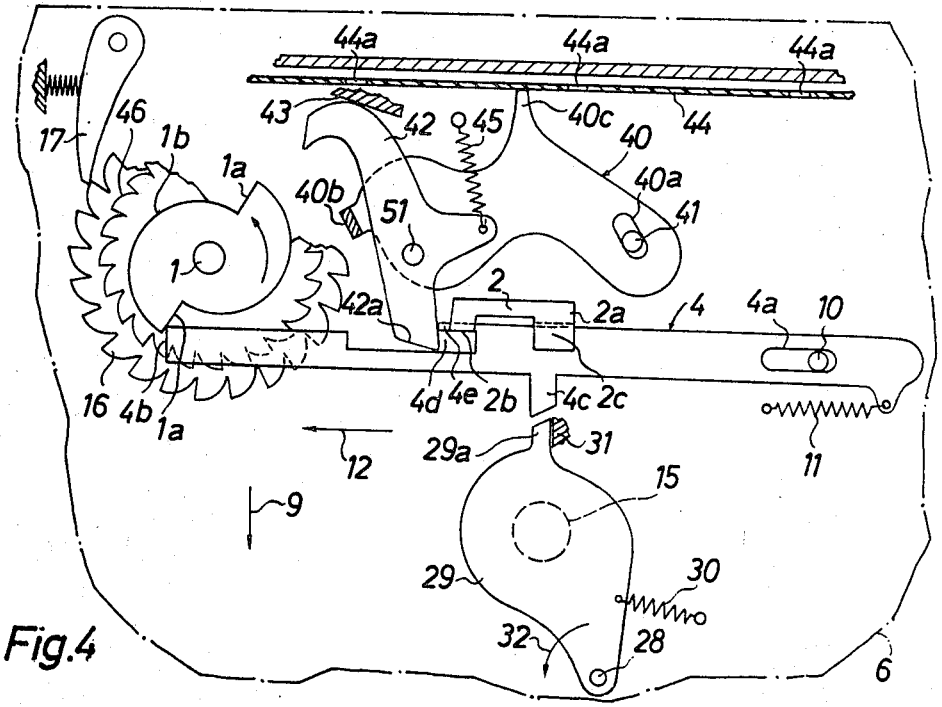
FIG. 4 illustrates the structure of FIG. 1 but with the locking and sensing means in positions which they assume when the film is being transported by the length of a frame.

As the spring 11 contracts while moving the bolt 4 in the direction indicated by arrow 12, it also tends to pivot the bolt in a clockwise direction so that the rear edge face 4r of the bolt bears against the cam 1A in a manner as shown in FIG. 3. The bolt 4 then prevents renewed depression of the slide 2 because its recess 4d does not register with the arm 2b. As shown in FIG. 4, the bolt 4 then maintains its motion transmitting projection 4e in the path of the arm 2b so that the slide 2 cannot be depressed again. In other words, the operator must actuate the lever 50 in order to advance the film 44 by the length of a frame whereby the film transporting mechanism causes the cam 1A to return the bolt 4 to the idle position shown in FIG. 1 so that the bolt permits depression of the slide 2. By actuating the lever 50, the operator turns the shaft 1 and cam 1A through the intermediary of the friction clutch 52 whereby the peripheral surface 1b of the cam 1A slides along the rear edge face 4r of the bolt 4 (See FIG. 3) until the other of the two teeth 1a reaches the end portion 4b and begins to push the bolt in a direction to the right to expand the spring 11. The shaft 1 can be rotated in a counterclockwise direction until the surface bounding the left-hand end of the slot 4a in the bolt 4 reaches the guide pin 10 (FIG. 1) whereupon the lever 50 turns with reference to the shaft 1 and continues to transport the film. The spring 11 then biases the bolt 4 in a direction to the left (arrow 12) and tends to rotate the cam 1A in a clockwise direction; however, such rotation of the cam 1A is prevented by a spring-biased pawl 17 mounted below the top wall of the housing 6 and cooperating with a ratchet wheel 16 affixed to the shaft 1. This ratchet wheel 16 permits counterclockwise rotation of the shaft 1 and cam 1A. When the bolt 4 returns to the idle position shown in FIG. 1, its recess 4d registers again with the arm 2b of the slide 2 so that the latter can be depressed in order to initiate an exposure. If the lever 50 of the film transporting mechanism is actuated at a time when the bolt 4 assumes the position shown in FIG. 1 but the transport of film by the length of a frame is not completed, the friction clutch 52 allows the lever 50 to turn with reference to the shaft 1 because the cam 1A is held against rotation by the end portion 4b while the surface bounding the left-hand end of the slot 4a in the bolt 4 bears against the guide pin 10.

Figure 2:
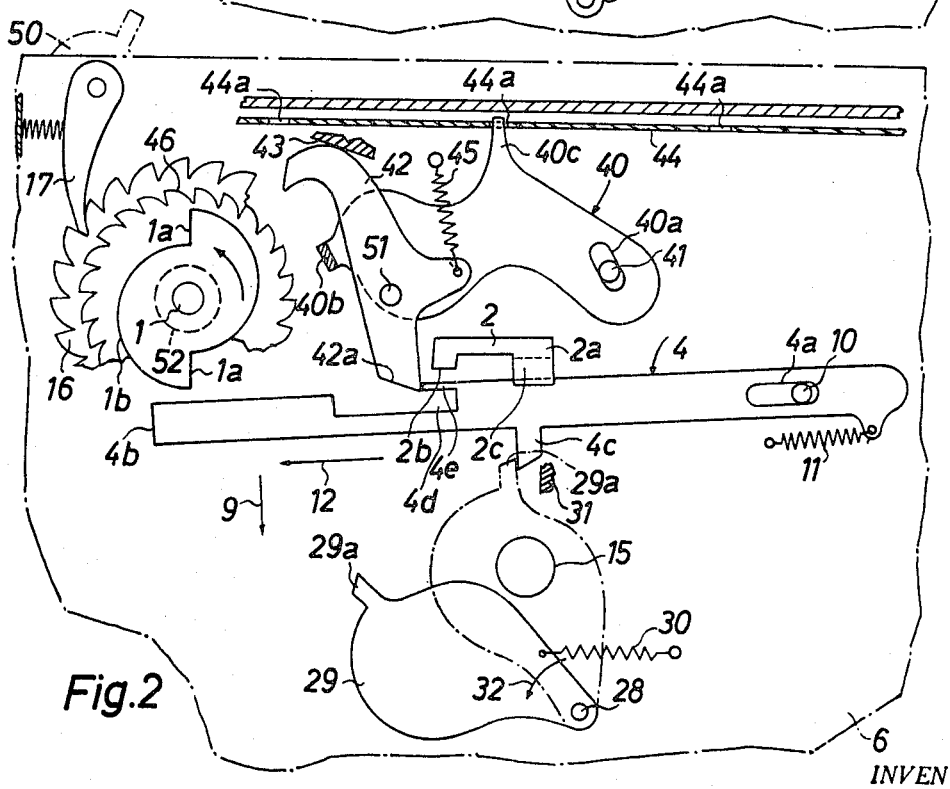
FIG. 2 is a similar schematic view but showing the locking means in disengaged position at the time when the shutter admits light to an unexposed film frame.

The shutter blade 29 is mounted on a horizontal pivot pin 28 (whose axis is normal to that of the guide pin 10) and is permanently biased against a stop 31 by a helical spring 30. A projection 29a of the blade 29 extends into the path of a projection or lug 4c extending forwardly from the front edge face 4s of the bolt 4. When the projection 29a bears against the stop 31, the blade 29 overlies the opening 15 and prevents scene light from reaching the unexposed film frame, i.e., the shutter is then closed. However, when the cam face 2c on the arm 2a pivots the bolt 4 in the direction indicated by arrow 9 so that the spring 11 is free to contract, the lug 4c strikes against the projection 29a and propels the blade 29 to the solid-line position of FIG. 2 in which the opening 15 is exposed and admits scene light against an unexposed frame of the film 44. As the spring 11 continues to contract, it moves the lug 4c beyond the arcuate path of the projection 29a so that the blade 29 is free to return to its normal closed position under the action of spring 30. The direction in which the shutter blade 29 moves in order to admit scene light to an unexposed film frame is indicated in FIG. 2 by arrow 32. The shutter shown in the drawing is a very simple impeller type shutter. The exposure time is determined by the bias of springs 11 and 30 and such exposure time can be varied by limiting the extent of movement of blade 29 in the direction indicated by arrow 32 and/or by changing the bias of the spring 30. It will be seen that the bolt 4 performs several functions including preventing repeated actuation of shutter release if the operator fails to transport port the film 44 subsequent to completion of an exposure and as an impeller for moving the shutter blade 29 to open position.

The heretofore described components of the camera are known and by themselves form no part of the present invention. In accordance with our invention, the film 44 is provided with a row of perforations 44a, one for each film frame. Such perforations may serve the sole purpose of limiting the extent to which the film is advanced in response to operation of the film transporting mechanism or the just described purpose and also as a means to cooperate with the sprocket or sprockets of the film transporting mechanism.

The camera is provided with a sensing member or detector 40 which resembles a pawl and is provided with an elongated slot 40a for a pivot pin 41 mounted on the top wall of the housing 6. Furthermore, the sensing member 40 comprises a bent-over portion or abutment 40b for a locking lever 42 which is coupled to the sensing member 40 by a pivot pin 51. One arm 42b of the locking lever 42 has a pallet which cooperates with a ratchet wheel 46 on the shaft 1, and the other arm 42a of the locking lever 42 can extend into the path of the aforementioned motion transmitting projection 4e at the rear edge face 4r of the bolt 4. The ratchet wheel 46 is coupled to the shaft 1 through the friction clutch 52, i.e., it can be said to form part of the film transporting mechanism. A spring 45 biases the locking lever 42 in a counterclockwise direction, as viewed in FIG. 1. This spring 45 operates between the housing 6 and locking lever 42 and is mounted in such a way that it also biases a sensing portion or tooth 40c of the sensing member 40 against the front side of the film 44. The sensing portion 40c is located at the level of the row of perforations 44a.

FIG. 1 illustrates the sensing member 40 40 in a position in which its sensing portion 40c extends into the adjoining perforation 44a. The slide 2 of the shutter release is ready to be depressed in order to disengage the bolt 4 from the cam 1A in a manner as described hereinbefore. The locking lever 42 maintains its arm 42b in engagement with one tooth of the ratchet wheel 46. The teeth of this hatchet wheel 46 are inclined differently from the teeth of the ratchet wheel 16 so that the shaft 1 is held against rotation in either direction. The spring 45 biases the locking lever 42 against the abutment 40b of the sensing member 40.

When the slide 2 is depressed, the bolt 4 is released for movement in the direction indicated by arrow 12 and its motion transmitting projection 4e engages the arm 42a to turn the locking lever 42 in a clockwise direction from the position shown in FIG. 1 to that shown in FIG. 2. The arm 42b is disengaged from the ratchet wheel 46 and the spring 45 stores energy while the arm 42b bears against a fixed stop 43 provided on the housing 6. The position of the sensing member 40 remains unchanged (compare FIGS. 1 and 2). As the bolt 4 continues to move in the direction indicated by arrow 12 (FIG. 2 shows the bolt in an intermediate position because the surface bounding the right-hand end of the slot 4a therein is not in abutment with the guide pin 10), the assembly including the locking lever 42 and sensing member 40 jackknifes in that the sensing member turns about and slides along the pin 41 while the locking lever turns about the pivot pin 51 to assume the position shown in FIG. 3. The sensing portion 40c of the sensing member 40 is withdrawn from the adjoining perforation 44a so that the film 44 can be transported in response to manipulation of the lever 50. During such jackknifing, the sensing member 40 turns in a counterclockwise direction while the locking lever 42 continues to turn in a clockwise direction to move from the position shown in FIG. 2 to that shown in FIG. 3.

FIG. 4 illustrates the parts of our camera in positions which they assume when the lever 50 is being actuated in order to move the film 44 in a direction to the left, as viewed in the drawing. One tooth 1a of the cam 1A bears against the end portion 4b of the bolt 4 and pushes the latter in a direction to the right, i.e., counter to the direction indicated by arrow 12. The locking lever 42 turns in a counterclockwise direction because the spring 45 biases its arm 42a against the motion transmitting projection 4e of the bolt 4. Since the arm 42b of the locking lever 42 bears against the stop 43 and since the sensing portion 40c of the sensing member 40 bears against the film 44, the sensing member is caused to move with reference to the pin 41 in a direction to the right and simultaneously turns in a clockwise direction. When the locking lever 42 again reaches the abutment 40b, it tends to turn the sensing member 40 in a clockwise direction because it is biased by the spring 45 which tends to move the pivot pin 51 upwardly as viewed in FIG. 4 whereby the sensing portion 40c penetrates into the next-following perforation 44a before the film 44 is transported by the full length of a frame. The film 44 then moves the sensing portion 40c a direction to the left whereby the locking lever 42 turns in a counterclockwise direction and its arm 42b engages the adjoining tooth of the ratchet wheel 46. This takes place when the film 44 has been transported by the full length of a frame.

An important advantage of our camera is that the sensing member 40 and locking lever 42 are moved in dependency on each other. This is in contrast to the construction of certain known cameras wherein the locking member is moved independently of the sensing member. The structure shown in the drawing is simple and can be produced at reasonable cost. Our camera is further believed to constitute an improvement over cameras wherein the locking member forms an integral part of the sensing member. This is due to the fact that the film 44 cannot urge the locking lever 42 against the ratchet wheel 46, i.e., the lever 42 is biased against this hatchet wheel by the spring 45 which can yield when necessary in order to avoid breakage of teeth on the wheel 46 and/or breakage or deformation of the lever 42.

It is clear that our camera is susceptible of many modifications without departing from the spirit of the present invention. For example, the arrangement can be such that the arm 42b of the locking lever 42 engages the ratchet wheel 46 at the exact moment when the sensing portion 40c of the sensing member 40 penetrates into a perforation 44a and that the sensing portion 40c is disengaged from the film 44 prior or subsequent to disengagement of arm 42b from the ratchet wheel 46. Furthermore, the bolt 4 need not necessarily serve as a means for propelling the shutter blade 29 to open position. Still further, the pin-and-slot connection 41, 40a between the sensing member 40 and housing 6 can be replaced by a link train and the locking lever 42 can be replaced by a slide which is reciprocable rather than turnable with reference to the sensing member 40.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

We claim:

1. In a photographic camera for use with film having perforations spaced from each other by distances corresponding to those between the centers of successive film frames, a combination comprising: a housing; shutter means movable in said housing between closed and open positions; release means operative to effect movement of said shutter means to open position; film transporting means supported by said housing and operative to advance the film lengthwise; sensing means movably installed in said housing and having a sensing portion normally engaging the film to penetrate into a perforation therein; locking means for locking said film transporting means; biasing means for biasing said locking means toward locking engagement with said film transporting means for locking the same; and shutter opening means arranged to open the shutter means in response to operation of said release means and cooperating with said sensing means to prevent said locking means from locking said film transporting means before said sensing portion of said sensing means penetrates into a perforation of the film.

2. A combination as defined in claim 1, wherein said biasing means is arranged to urge said sensing portion against the film.

3. A combination as defined in claim 2, wherein said biasing means comprises resilient means operating between said locking means and said housing.

4. A combination as defined in claim 2, wherein said sensing means comprises an abutment and wherein said biasing means normally urges said locking means against said abutment.

5. A combination as defined in claim 1, wherein said locking means comprises an arm and said shutter opening means is arranged to move in a first direction in response to operation of said release means and to move in the opposite direction in response to operation of said film transporting means, said shutter opening means comprising a motion transmitting portion cooperating with said arm to disengage said locking means from said film transporting means in response to movement of said shutter opening means in said first direction.

6. A combination as defined in claim 5, wherein said shutter opening means comprises a bolt which is arranged to prevent double exposure of film frames by preventing operation of said release means upon movement in said first direction.

7. A combination as defined in claim 5, wherein said motion transmitting portion is arranged to withdraw said sensing portion from the perforation of said film in response to movement of said shutter opening means in said first direction.

8. A combination as defined in claim 7, further comprising resilient means for biasing said arm against said motion transmitting portion and for moving said sensing portion against the film in response to movement of said shutter opening means in said opposite direction so that the sensing portion can enter the next following perforation in response to operation of said film transporting means.

9. A combination as defined in claim 1, wherein said locking means is pivotable with reference to said sensing means about the axis of a pivot member on said locking means.

10. A combination as defined in claim 1, wherein said sensing means is provided with a slot and further comprising pivot means provided on said housing and extending into said slot to permit pivotal and limited reciprocatory movements of said sensing means.

11. A combination as defined in claim 1, wherein said film transporting means comprises a manually operated turnable actuating member and a ratchet wheel connected with said actuating member, said locking means comprising an arm engaging with said ratchet wheel upon completed advance of the film by the length of a frame.

12. A combination as defined in claim 1. wherein said locking means is pivotable on said sensing means and forms therewith an assembly which jackknifes in response to operation of said release means.